United States Patent [19]

Davies et al.

[11] Patent Number: 5,756,206
[45] Date of Patent: May 26, 1998

[54] FLEXIBLE LOW BULK PRE-IMPREGNATED TOW

[75] Inventors: Robert M. Davies, Woodstock; Alagirusamy Ramasamy, Atlanta, both of Ga.

[73] Assignee: Custom Composite Materials, Inc., Marietta, Ga.

[21] Appl. No.: 404,872

[22] Filed: Mar. 15, 1995

[51] Int. Cl.$^6$ ............................................. B32B 9/00
[52] U.S. Cl. ..................... 428/367; 428/372; 428/375; 428/377; 428/378; 428/373; 428/392; 428/394; 428/395
[58] Field of Search ........................... 428/364, 375, 428/328, 372, 367, 373, 374, 377, 392, 394, 395, 408; 427/243, 288, 197, 198, 389.8, 422

[56] References Cited

U.S. PATENT DOCUMENTS

| | | | |
|---|---|---|---|
| 2,424,743 | 7/1947 | Davis | 428/372 |
| 3,050,824 | 8/1962 | Lemelson | 428/372 |
| 3,377,233 | 4/1968 | Jackson | 428/372 |
| 3,382,662 | 5/1968 | Seelig et al. | 428/372 |
| 3,579,409 | 5/1971 | Shannon | 428/372 |
| 3,586,560 | 6/1971 | Stranch et al. | |
| 3,798,095 | 3/1974 | Hall . | |
| 3,817,211 | 6/1974 | Brown et al. | |
| 3,922,455 | 11/1975 | Brumlik | 428/372 |
| 3,940,464 | 2/1976 | Davis et al. | |
| 4,541,884 | 9/1985 | Cogswell et al. | |
| 4,549,920 | 10/1985 | Cogswell et al. | |
| 4,559,262 | 12/1985 | Cogswell et al. | |
| 4,588,538 | 5/1986 | Chung et al. | |
| 4,614,678 | 9/1986 | Ganga . | |
| 4,648,224 | 3/1987 | Kitta et al. | 428/372 |
| 4,713,139 | 12/1987 | Ganga . | |
| 4,728,387 | 3/1988 | Hilakos . | |
| 4,764,427 | 8/1988 | Hara et al. | 428/375 |
| 4,770,915 | 9/1988 | Nakagawa et al. | 428/375 |
| 4,772,502 | 9/1988 | Okura et al. | 428/373 |
| 4,800,113 | 1/1989 | O'Connor | 428/373 |
| 4,839,199 | 6/1989 | de Jager . | |
| 5,057,338 | 10/1991 | Baucom et al. | |
| 5,094,883 | 3/1992 | Muzzy et al. | |
| 5,128,198 | 7/1992 | Dyksterhouse et al. | |
| 5,171,630 | 12/1992 | Muzzy et al. | |
| 5,176,775 | 1/1993 | Montsinger . | |
| 5,206,085 | 4/1993 | Nakagawa et al. | 428/373 |
| 5,464,684 | 11/1995 | Vogelsang et al. | 428/374 |
| 5,470,656 | 11/1995 | Kennard et al. | 428/373 |

OTHER PUBLICATIONS

Merriam Websters Collegiate Dictionary 10th Ed.; 1996, p. 331.

*Primary Examiner*—Patrick Ryan
*Assistant Examiner*—J. M. Gray
*Attorney, Agent, or Firm*—Deveau, Colton & Marquis

[57] ABSTRACT

A method for producing flexible, low-bulk towpreg which involves powder coating a bundle of unspread fiber tows arranged in a predetermined cross-sectional shape, and the resulting towpreg. During the powder coating process, the resin powder particles do not enter into the fiber bundle, but rather only coat the surface fibers comprising the tows, resulting in dry fibers in the core of the towpreg and outer fibers which are coated with a discontinuous sheath of resin on the surface of the towpreg surrounding the core of dry fibers. The resin layer on the surface of the towpreg is formed by a partial melting of the powder particles. A post treatment process can be used to convert flat ribbon towpreg produced in accordance with the present invention into flexible unidirectional tape.

17 Claims, 7 Drawing Sheets

FLEXIBLE LOW BULK PRE-IMPREGNATED TOW

BACKGROUND OF THE INVENTION

1. Field of the Invention

The present invention relates to a method of producing towpregs and, more particularly, to a method of producing towpregs having low bulk and low bending rigidity which utilizes powder coating or a similar coating process. The method of the present invention involves the steps of converting unsized, high-performance tows into a preselected cross-sectional form, such as flat ribbon form, coating only the outer fibers of the tow form with resin particles while leaving the interior fibers of the tow form uncoated, partially melting the resin particles onto the tow to create a discontinuous sheath of resin about the tow, and winding the resulting flexible low bulk towpreg onto take-up bobbins. The resulting towpreg can be processed further into other useful, typically stiffer and lighter, components.

2. Prior Art

Towpregs comprising fibers combined with a matrix resin are one form of prepreg. Conventional prepreg consists of hundreds or thousands of fibers embedded in a continuous mass of matrix. The reinforcing fibers typically used are available commercially in continuous form in bundles known as tows, which vary widely in number of fibers per tow. Many matrix resins are available; however two kinds of matrix resin systems dominate the prior art: thermoplastic and partially cured thermoset polymers.

Thermoplastic polymers have advantages over thermosetting materials in fracture toughness, impact strength and environmental resistance. Thermoplastics also provide prepregs with indefinite shelf life, give the fabricator better quality assurance and avoid the storage and refrigeration problems associated with thermosetting prepreg. The disadvantage of thermoplastic polymers as a matrix material is the difficulty of uniformly coating the fibers due to the high viscosity of the molten polymer. Thermoplastic prepregs also typically are rigid and less well-suited for weaving or braiding, and the resulting fabrics are stiff. Similarly, the rigidity of thermoplastic coated prepregs complicates the formation of complex shapes; heat must be focused at the point of contact to achieve conformability during layup.

Prepregs containing thermosetting prepolymers, although relatively flexible, may be tacky, thus requiring a protective release coating, typically a release paper or film, which must be removed prior to use. While thermoset prepregs are acceptable for many applications, their tackiness and the requirement of a protective release coating have made thermoset towpregs unfeasible for weaving and braiding.

Two other types of towpreg are metal matrix towpreg, which is similar to thermoplastic towpreg, and partially cured ceramic towpreg, which is similar to thermoset towpreg. Due to the limited markets for metal and ceramic towpregs and composites, these materials are not generally available and have not been the focus of developments in manufacturing technology. Metal and ceramic matrix towpregs can be manufactured in a manner and form analogous to thermoplastic and thermosetting towpregs.

Continuous fiber prepregs can be produced by a number of impregnation methods including hot melt, solution, emulsion, slurry, surface polymerization, fiber commingling, film interleaving, electroplating, and dry powder techniques.

In hot melt processing, impregnation can be accomplished by forcing the fiber and resin through a die at high temperature under conditions that create high shear rates. Due to the high temperatures of this process, the thermoplastic material can degrade. Other disadvantages of this process include the high stress applied to the fibers and difficulties in impregnating the fiber tows with thermoplastics, leading to low processing speeds.

In solution coating, the matrix material is dissolved in solvent and the fiber is passed through this solution and then dried to evaporate the solvent. Two disadvantages of this process are that thermoplastics usually exhibit limited solubility at high concentration, and most engineering thermoplastics cannot be dissolved in a low boiling solvent at room temperature. Additionally, high solution viscosity results in the same impregnation problems as with hot melt, as well as causing the fibers to stick together. Another problem is the difficulty in removing the solvent. Further, traces of solvent left in the prepreg lead to undesirable porosity in the composite structures.

An emulsion process is one way to apply particulate polymer matrix material with a very small particle size to towpreg fiber by synthesizing the resin as an aqueous emulsion with a surfactant. The problem with this process is that the removal of the surfactant from the final towpreg is difficult.

Slurry coating or wet powder processing is a non-solvent coating technique designed to resolve the problem of the insolubility of most thermoplastics in a solvent at room temperature. In slurry coating, the powder is suspended in a liquid medium, wherein no solvency exists between the resin and the medium, and the fibers are drawn through the slurry. The slurried particulate matrix does not substantially wetout the fiber, resulting in the need for higher pressures to consolidate the matrix and fibers into a prepreg. This prepreg can be tacky, which is not suitable for weaving or braiding. Other disadvantages include the necessity for the removal of the liquid medium, volatiles, and dispersants or surfactants which are used to form the polymer/liquid colloidal state, the likelihood of aggregates in the slurry caused by poor mixing, and the possibility that polymer particles will settle during processing.

To achieve intimate mixing in emulsion or slurry coating, the particulate size of the slurry or emulsion should be smaller than the fiber diameter. For many of the thermoplastics that cannot be made by emulsion or dispersion polymerization, it is extremely difficult to produce such fine powder. Thus, a coarse blend between fibers and particles is obtained. The quality of the blend decreases as the particle size increases, leading to poor matrix distribution in the consolidated towpreg, and a poor composite structure.

In surface polymerization, coating results from the polymerization of the polymer matrix on the fiber substrate. Disadvantages associated with this process include the need to remove undesired materials, such as solvent, inhibitor, or by-products of the polymerization reactions. Surface polymerization only can be conducted by special techniques, such as electropolymerization, which cannot be used to produce many of the polymeric matrices of commercial interest.

In fiber commingling, the polymeric matrix is introduced in fibrous form. Polymeric and reinforcing fibers are mingled as dry blends; however, wetting of the fiber by a process such as melting the polymer fiber is deterred until the towpreg is consolidated. Effective impregnation depends on the degree of randomness of the intermingling of the resin and fiber throughout the system. Since no wetting of the reinforcing fibers by the matrix material occurs, higher pressures are needed to consolidate the towpreg under equivalent processing times and temperatures, as compared to completely wetted towpregs.

Film casting is one method for producing prepreg which resolves some of the problems associated with hot melt impregnation of thermoplastics. It consists of stacking a film layer of matrix material cast from either hot melt or solution over the towpreg fibers. The fibers sandwiched between two films are heated and calendered to force the resin into the fibers.

Powder coating of fibers has significant advantages in that no solvent is required and no high stress is introduced in the process. The powdered resin must be solid at ambient and elevated storage temperatures, and be capable of melting to permit flow and to penetrate the fiber tow when heated. Dry powder coating has many advantages because the elimination of a wet base, solvent or water, facilitates reclamation of the coating material. This is an important economic advantage which promises a high utilization of powder plus elimination of expensive solvents.

Another method of powder coating fibers with matrix is disclosed in Ganga, U.S. Pat. No. 4,614,678 and Ganga, U.S. Pat. No. 4,713,139, the later of which was a divisional application of the former. This method entails impregnating fibers with dry thermoplastic polymer powder and then covering the coated fibers with a continuous thermoplastic sheath which leads to higher bulk. However, as the matrix powder is not melted onto the fibers, only fibers in contact with the sheath may have adhered to the matrix. This results in a three component product: fibers, matrix powder, and a separate continuous sheath. Consolidating this towpreg also requires higher pressures under comparable processing conditions than completely wetout towpreg. Furthermore, as in slurry coating, a fine polymer powder, generally less than 20 microns, is recommended for this process. Producing such fine powder from thermoplastics can be very expensive.

Intermediate composite products, such as towpreg, must contain sufficient matrix, typically over 15% by volume, to permit consolidation of the components into a substantially void-free towpreg structure without requiring the incorporation of more matrix material. Linear towpregs can be converted into two and three dimensional product forms by weaving, braiding, filament winding, and other known processes. Alternatively, these towpregs can be used to create a discontinuous fiber reinforced feedstock for molding by chopping, cutting, or like known processes.

Towpreg can be converted to a preform of a predetermined shape and fiber orientation. Preforms can be produced by any one of the conventional textile preforming methods, such as weaving, braiding and knitting, or by processes such as filament winding and tape laying. Preforms ultimately or concurrently can be consolidated into composite parts by applying heat and pressure.

Textile preforming operations require that the towpreg be flexible. In a powder coated tow, the fibers are not necessarily connected by the resin material at all places. This provides freedom for the fibers to move relative to each other. Due to this structure, towpreg produced by a powder coating process has the potential to be flexible. A powder coating process, such as the one disclosed in Muzzy, et al., U.S. Pat. No. 5,094,883, typically involves the following four steps:

1. Spreading the high performance filaments into sheet form, almost to individual filament level;
2. Incorporating the matrix powder particles between the filaments;
3. Partially melting the powder particles to the filaments; and
4. Condensing the sheet of filaments back into strand form.

Figure 1A:
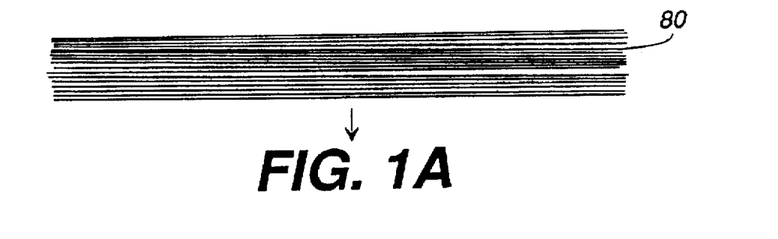
FIGS. 1A–1C illustrates the high bulk of a powder coated tow produced by conventional powder coating techniques.
Figure 1B:
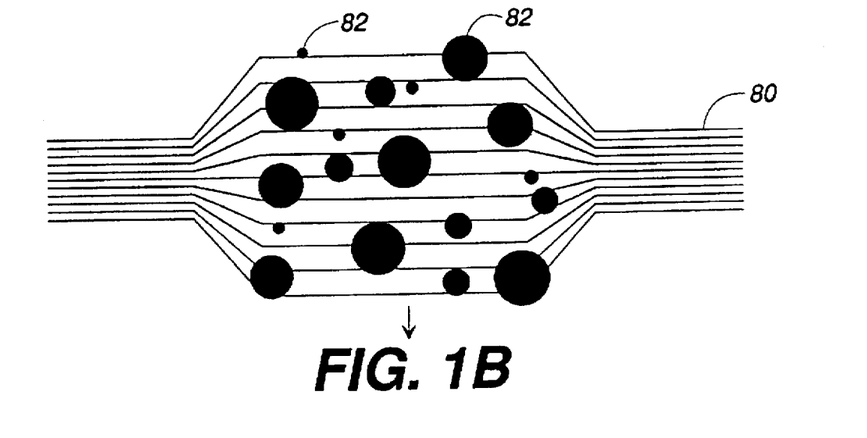
Figure 1C:
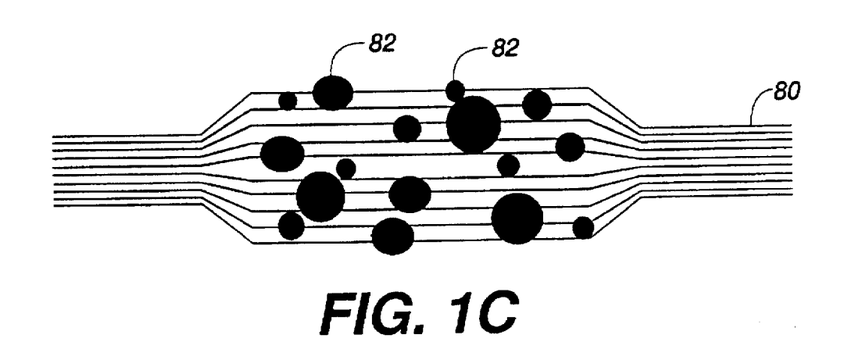

During this process, the powder particles, generally of size 20 to 200 microns, are placed in-between the filaments, generally of a diameter as small as 5 microns. As a result, after powder coating, it is not possible for the filaments to pack as tightly as they were packed before powder coating. FIG. 1 illustrates this phenomenon schematically. Hence, the resulting towpreg, while flexible, tends to be bulky. The high bulk of the towpregs poses various problems in the processing of these towpregs. High bulk towpreg or preforms require molds with deeper cavities than molds used for lower bulk towpreg or preforms. Therefore, to process the high bulk towpreg or preforms, the existing molds may need to be redesigned. Another problem arises during consolidation. To consolidate the high bulk towpreg or preforms, the mold halves have to move larger distances for full consolidation. This can cause larger fiber disorientation leading to weaker parts. Another problem is that high bulk towpreg and preforms are difficult to fit into molds used for making smaller sized parts with processes such as expansion molding. Another problem is that textile processing of high bulk towpreg results in more processing problems than in textile processing of low bulk towpreg.

Current powder coating methods generally are incompatible with the utilization of sizing agents. Since most fibers used as reinforcement are very fragile, sizing agents which are compatible with the resin matrix often are used to protect the fibers. However, sizing tends to glue the fibers together, which makes fiber spreading difficult. Since prior art powder coating processes require that the fibers be spread prior to powder coating, the fibers cannot be sized. This limits the types of fibers which can be used with current powder coating processes to fibers which are less fragile or less easily damaged.

For all of these reasons, it is very important to have towpregs with the least amount of bulk possible. However, as stated above, with the existing methods of powder coating, spreading techniques are used to make the powder particles penetrate into the fiber bundle, thus making it very difficult to reduce the bulk of the towpregs. Therefore, a need exists in the industry for a method of producing relatively low bulk and flexible towpreg which can be accomplished by utilizing powder coating techniques and the advantages thereof.

SUMMARY OF THE INVENTION

The present invention generally involves converting high performance fiber tows into a predetermined cross-sectional form by one of a plurality of different methods, powder coating the cross-sectional form with preselected resin particles, partially melting the particles onto the exterior fibers of the fiber bundle such that the interior fibers remain uncoated and a discontinuous sheath of resin is created on the exterior of the fiber bundle. The resulting towpreg is wound onto take-up bobbins. The towpreg then can be further processed.

The resulting flexible towpreg then can be converted into preforms for composite applications through one of many conventional textile processes, or by tape laying or filament winding. Although the towpregs in the flat ribbon shape obtained when the flat ribbon form is used are quite suitable for many applications, towpregs with elliptical or more circular sections are preferable in many textile processes such as braiding and knitting. Therefore, the present invention also proposes a post treatment process, described in detail below, which can be used to convert the flat ribbons into more of an elliptical section.

The method involves coating unspread fiber tows in various cross-sectional configurations with a matrix resin. The tows are arranged in a predetermined cross-sectional shape, such as flat ribbon form, tapes, ellipses, rectangles and circles. The reshaping of the cross-section of the tow may be obtained by different means such as, for example, roller flattening or passing the tow through an aperture. An appropriate sizing agent can be used to hold the fibers together in the required shape. During the coating process, since the fibers are not spread, the resin particles do not enter into the fiber bundle, but rather coat only the surface of the tows. This results in dry internal fibers in the core of the towpreg and a discontinuous sheath of substantially wet out external fibers.

The external fibers are mostly wet out on the surface of the towpreg; however, the resin sheath does not completely coat the entire surface of the fiber bundle, resulting in decreased bending rigidity. The resin layer on the surface of the towpreg is formed by a partial melting of the resin particles, resulting in the fusing of the particles onto the tows. Partially melting the particles results in a resin layer which does not completely cover the surface of the towpreg. This type of discontinuous sheath-dry core structure results in a towpreg with relatively low bulk and comparable bending rigidity in comparison to towpregs produced with the existing powder coating method.

Accordingly, it is a primary object of the present invention to provide a method for producing flexible towpregs with the least possible bulk using high performance fibers such as carbon, aramids, glass fibers, etc., and resin materials including both thermoset and thermoplastic resins.

It is another object of the present invention to provide a method for producing low-bulk, flexible towpregs having at least 15% resin by volume, thereby permitting consolidation of the components into a substantially void-free composite structures.

It is another object of the present invention to provide a method for producing low-bulk, flexible towpregs wherein the resin particles are uniformly distributed across and along the exterior fibers of the tow, so that with application of pressure and temperature, the resin will be able to melt and flow between the fibers to result in a uniform degree of wetout of the fibers when forming a composite article.

It is yet another object of the present invention to provide a method for producing low-bulk, flexible towpregs which method allows the maximum number of fibers to be covered with the resin material without increasing the bulk or rigidity of the towpreg.

It is yet another object of the present invention to provide a method for producing low-bulk, flexible towpregs which proposes partial, as opposed to complete, melting of the resin powder particles to achieve adhesion of the resin to the fibers.

Another object of the present invention is to provide a towpreg comprising a bundle of fibers, the interior fibers remaining free of matrix forming resin particles and the exterior fibers being partially coated with a discontinuous sheath of matrix forming resin.

It is yet another object of the present invention to provide a method for producing low-bulk, flexible towpregs which is suitable for processing various types of commercially available fibers and resin materials in a economically viable manner.

It is yet another object of the present invention to provide a method for converting flat ribbon towpreg produced in accordance with the present invention into flexible unidirectional tape.

These objects and other objects, features and advantages of the present invention will become apparent from the following discussion when read in conjunction with the attached figures, in which like reference numerals correspond to like components throughout the several views.

DETAILED DESCRIPTION OF THE INVENTION

Reducing the bulk of the towpreg without sacrificing the flexibility and other properties of the towpreg is an important advantage of the present invention. This is accomplished by suitably modifying the fiber architecture of the tow before coating the fibers with resin material.

As shown in FIGS. 1A–1C, conventional powder coating involves spreading the tows to a width typically in the range of 100 to 130 mm for a 12,000 filament carbon fiber tow. Other fiber tows are available ranging from 1000 to 300,000 fibers, all of which are suitable for the present process. Any of the typical fibers may be used for the tow. Preferably, the fibers have a modulus of elasticity of at least approximately 34 GPa and a tensile strength of at least approximately 0.70 GPa. Fibers made from carbon, organic compounds, glasses, metals, and ceramics having the above physical characteristics are most preferred.

The present invention can be accomplished using both thermoset and thermoplastic resin particles. The preferred thermosets include epoxies, polyesters, acrylics, polyimides, and phenolics. The preferred thermoplastics include nylons, polypropylenes, polyesters, polycarbonates, acrylics, polyimides, polyetherimides, and polyaryl ethers.

In the conventional process, after the powder particles 82 are placed between the fibers 80 (FIG. 1B), typically by using an electrostatic fluidized bed, these particles 82 are fused to the fibers 80 by passing the coated fibers through a hot oven. The fibers are condensed (FIG. 1C) after the resin particles are cooled. However, since the powder particles are fused to the fibers while the fibers are in a spread configuration, the fibers do not pack as closely together after condensation. This generally leads to the towpregs having relatively high bulk.

Figure 2:
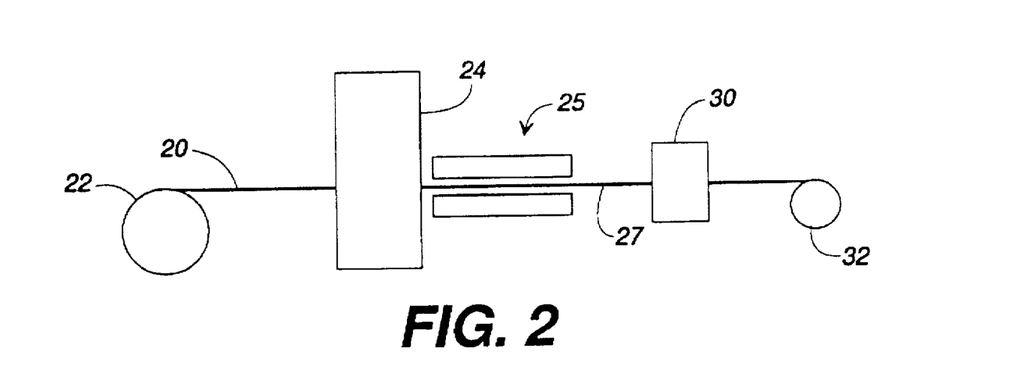
FIG. 2 illustrates a first embodiment of the powder coating system and method of the present invention.

In accordance with the present invention, the spreading process used in conventional powder coating is eliminated. A uniform distribution of resin particles on the fiber tow exterior is obtained by suitably modifying the tow architecture before coating the tows. FIG. 2 is a schematic diagram illustrating the principles of the powder coating process of the present invention. The tow 20 from the supply package 22 is unwound and fed to the powder coating chamber 24, where the electrostatically charged resin powder particles (not shown) are deposited onto the fibers of the tow. Once the tow 20 emerges out of the powder coating chamber 24, the tow 20 is passed through an oven or heater 25 where the powder particles are partially melted onto the fibers. The hot towpreg 27 is then cooled by passing the tow 20 around a cooling roller contained within cooling system 30 before being wound onto a take-up package 32.

The resin picked up by the tow can be controlled by changing the level of electrostatic charging, the powder feed rate and the tow speed. Higher charge on the powder particles, higher powder feed rate and slower tow speed increase the powder pickup. The temperature of the oven is selected depending on the melting temperature of the matrix powder being used. The temperature is selected in such a way that the powder particles are partially melted in order to adhere to the tow. Complete melting of the resin results in wicking of the melted resin along the tows and a stiffer towpreg. Insufficient heating of the powder results in poor adhesion of the powder to the tows and in powder falling off in subsequent processing. Typically the powder coating line is operated in the range of approximately 10 to 60 meters per minute. The range for the radiant panel temperature is 650° C. to 950° C. depending on the polymer and line speed.

Figure 3A:
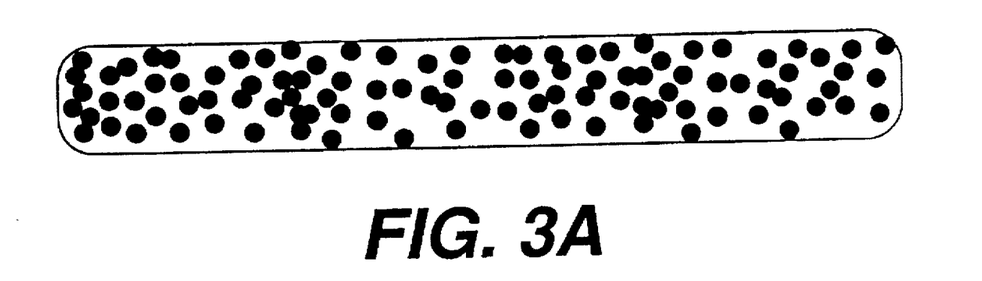
FIGS. 3A–3D illustrates the different types of cross-sectional geometries for the tows which are suitable for use with the present invention.
Figure 3B:
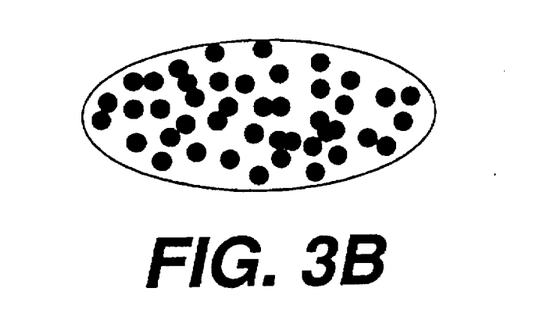
Figure 3C:
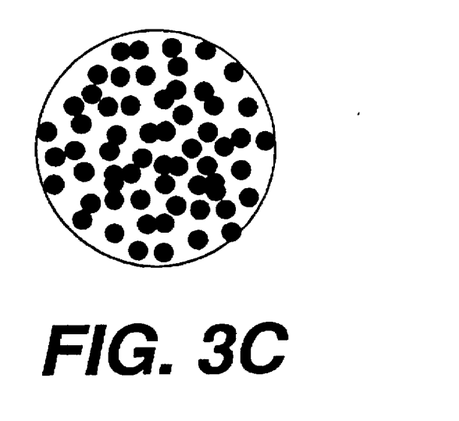
Figure 3D:
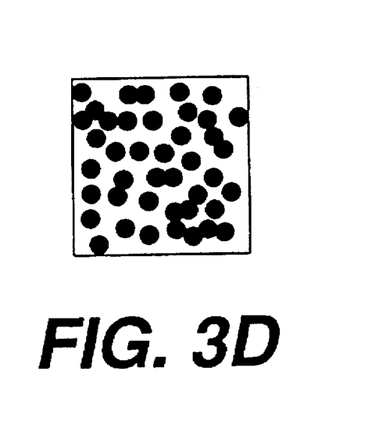
Figure 4A:
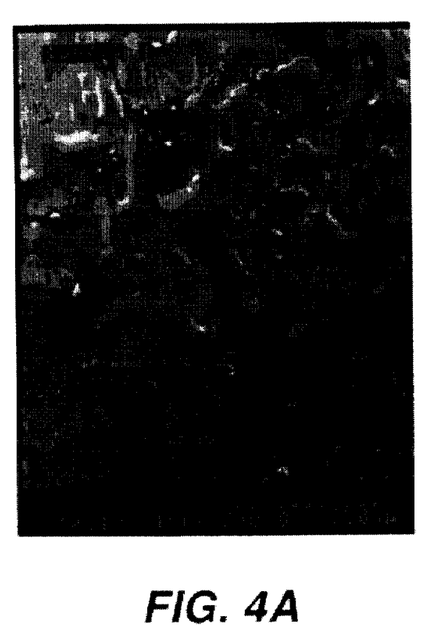
FIGS. 4A–4D contain scanning electron micrographs of the surface and cross-section of a towpreg produced in accordance with the present invention, illustrating the discontinuous sheath nature of the outer coating of resin material.
Figure 4B:
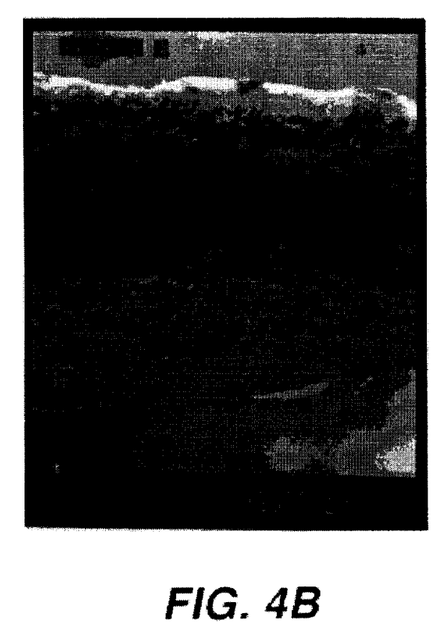
Figure 4C:
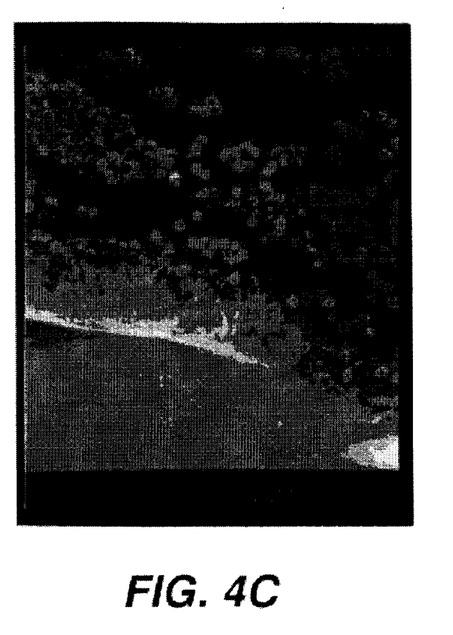
Figure 4D:
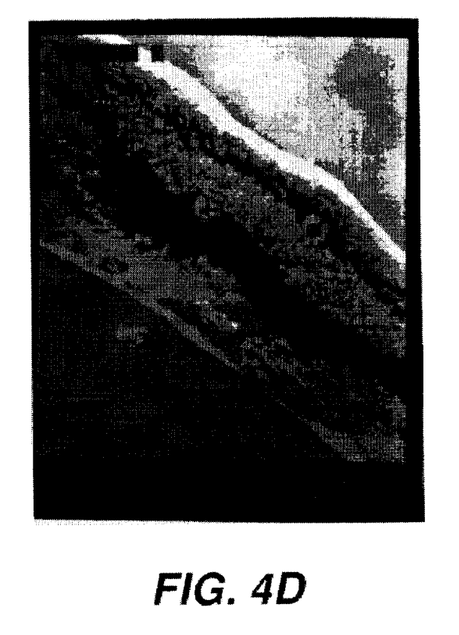

The qualities of the towpreg, such as bending rigidity, and the properties of laminates produced from these towpregs depend upon the cross-sectional shape of the tow, the resin content and the powder coating conditions. Different possible geometries of the cross sections of the tow are provided in FIGS. 3A-3D. FIG. 3A shows a flat ribbon geometry, FIG. 3B shows an elliptical geometry, FIG. 3C shows a circular geometry, FIG. 3D shows a square geometry. These different shapes can be obtained by passing the tows through a bath containing sizing agent and then through a die with the required cross-sectional shape, or by other means without using sizing agents. The general range in the amount of size used is 0.5% to 5.0% by weight.

The types of the sizing agents influence the interface of the composite system to a large extent. A strong interface between the fiber and the resin results in an effective load transfer between the fiber and resin. The interface plays an important role in the shear and fatigue performance of the composite. Hence, having the right size or sizing agent on the tow to promote adhesion is very important.

The following examples illustrate the effect of the cross-sectional geometry and the effect of having the right sizing agent on the fibers while forming the desired cross-sectional shape of the tows.

EXAMPLE I

Circular cross section with no sizing agent. Unsized 12K G30-500 (Toho Industries, Japan) carbon fibers were unwound from the supply package. Each carbon fiber has a diameter of approximately 8 microns. Application of 90 g tension to a tow of these fibers brought the tow to a circular section having a diameter of about 2.2 mm. This tow was then passed through a powder coating chamber containing a charged powder cloud of the matrix resin particles. The line speed was 18.3 meter/minute (60 ft/minute), hence the residence time for the tows inside the powder coating chamber was 2.6 seconds. The tow was passed through an oven once it emerged from the powder coating chamber. The temperature of the heating element was kept at approximately 900° C. The residence time inside the oven was 2.0 seconds. The powder used in this case was nylon 6 with a mean particle size of 100 microns with a range of 20 to 400 microns. The powder content in the towpreg was 32.0% by weight. Assuming hexagonal close packing of the fibers and complete wet out of the surface layers of fibers, the result is a towpreg wherein 1 out of every 16 fibers is completely wet out, these being the exterior or surface fibers.

The bending rigidity of the resulting towpreg was $305 \times 10^{-8}$ $Nm^2$. Uncoated 12K G30-500 carbon tow has a bending rigidity of $14 \times 10^{-8}$ $Nm^2$. Bending rigidity was measured using a pure bending mode in a Kawabata Evaluation System, a highly sensitive method used for measuring bending rigidity of textile strands. The method is described in Ramasamy, A., Y. Wang, and J. Muzzy, *Characterization of Powder Coated Towpregs and 2D Preforms*, 38 Int'l SAMPE Symposium 1882-91 (1993), incorporated herein. Laminates were made with the towpregs under the following processing conditions: consolidation pressure 700 kPa; temperature 260° C.; and time 20 minutes. The laminates were tested in a three point bending configuration. The ultimate strength in the longitudinal direction was 1.4 GPa and that in the transverse direction was 0.060 GPa. There was a significant amount of dry fibers in the cross-section of the laminate. Increasing time, temperature and/or pressure would eliminate these dry fibers and increase the strength of the laminates.

EXAMPLE II

Ribbon cross section with epoxy sizing. Epoxy-sized 12K T700 carbon fiber tows (Torayca, Japan) having flat ribbon shape in cross section were powder coated with nylon 6 powder. The uncoated tow had a width of approximately 6.35 mm and a thickness of about 0.13 mm. The amount of size present in the tow was 1.0% of the weight of the fibers. The towpregs were produced using conditions similar to those used in Example I. The powder content in the tow in this case was 36.2%. The increased powder pickup, as compared to Example I, was due to the increased surface area of the tow. For this flat ribbon cross-section, assuming hexagonal close packing of the fibers and complete wet out of the surface layers of fibers, should result in a towpreg wherein 1 out of every 6 fibers is completely wet out by the resin, these also being the exterior or surface fibers.

FIGS. 4A-4D shows the scanning electron micrographs of both the surface (FIGS. 4A and 4B) and the cross-section (FIGS. 4C and 4D) of the towpreg of this example. FIGS. 4A-4D shows the presence of dry fibers in the core of the towpreg and at least one layer of fibers on the surface being substantially but not completely wet out by the resin. FIGS. 4A-4D also shows the discontinuous nature of the resin sheath about the exterior of the tow. The discontinuous sheath results in a towpreg having a lower bending rigidity.

During consolidation, the dry fibers in the core are wet out completely by the resin due to the consolidation pressure and temperature. The gaps between the fibers in the sheath assist in resin flow from the surface of the towpreg to the core, resulting in wet out of the dry fibers under consolidation pressure. The bending rigidity of the tow was $112 \times 10^{-8}$ Nm². Laminates were made with these towpregs using the same consolidation conditions as in Example I. The ultimate strength in the longitudinal direction was 1.6 GPa and that in the transverse direction was 0.06 GPa. Dry fibers were not observed in the cross-section of the laminates.

EXAMPLE III

Figure 5:
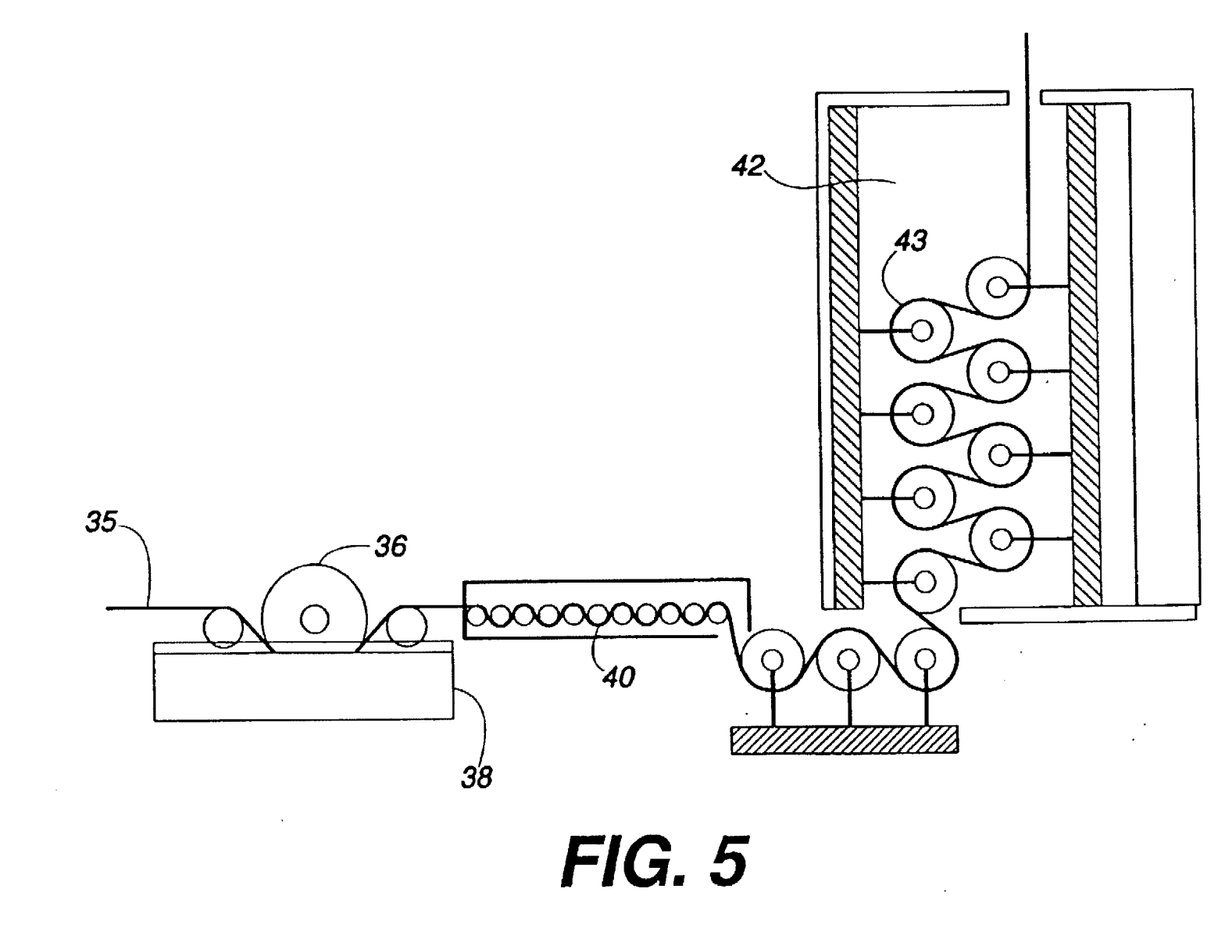
FIG. 5 illustrates a second embodiment of the powder coating system and method of the present invention.

Ribbon cross section with nylon sizing. Unsized 12K G30-500 (Toho Industries, Japan) carbon fiber tows were sized with a nylon terpolymer sizing agent using the system shown in FIG. 5. The tows 35 were dipped by a dip roller assembly 36 into a size bath 38, passed through a set of flattening rollers 40, passed over drying rollers 43 contained in oven 42, and then to a take up winder where they were taken up on take up bobbins (not shown). The resulting tow from this setup was a flat ribbon, approximately 5.80 mm wide and about 0.152 mm thick. The tow had a size content of 1.5% of the total weight of the tow. These tows were powder coated with nylon 6 using conditions similar to those used in Example I. The powder content in the tow in this case was 34.5%. The bending rigidity of the resulting tow was $135 \times 10^{-8}$ Nm². Laminates were made with these towpregs under the same consolidation conditions as in Example I. The ultimate strength in the longitudinal direction was 2.0 GPa and that in the transverse direction was 0.16 GPa. Hence, the presence of nylon size when producing a nylon matrix composite results in higher mechanical properties. Dry fibers were not observed in the cross-section of the laminates.

EXAMPLE IV

Ribbon cross section with on-line sizing. Unsized 12K G30-500 (Toho Industries, Japan) carbon fiber tows were sized with a nylon terpolymer sizing agent using an on-line sizing with the powder coating process. In this case the sizing unit shown in FIG. 5 was placed on-line with the powder coating line, except that the drying rollers 43 were removed and the tows were dried by blowing hot air on the flattening rollers 40. The line speed in this case was 1.2 meter/minute. The infrared heating element temperature was 520° C. The powder pickup in this example was 40.1% because of the slower line speed. The bending rigidity of the resulting towpreg was $298 \times 10^{-8}$ Nm². Laminates were made with these towpregs under the same consolidation conditions as in Example I. The ultimate strength in the longitudinal direction was 1.6 GPa and that in the transverse direction was 0.13 GPa. This example demonstrates the feasibility of on-line sizing and restructuring of the tow cross-section along with powder coating.

The above examples illustrate different methods to make flexible towpregs with low bulk without spreading the tows. Similar types of structures also can be obtained using resin material in forms other than powder. One method is to cover the surface of the tows with very fine short fibers made out of resin by processes such as melt blowing. In the melt blowing process, the polymer is melted and extruded through spinnerets while compressed hot air is forced into the spinnerets. This causes the resin to be deposited on the tow surface in the form of a network of short, fine fibers. For example, see U.S. Pat. No. 4,380,570 to Schwarz, incorporated herein.

The present invention eliminates the need for spreading the tows, thereby allowing multiple tows to be run simultaneously through the powder coating line close together to achieve high production rates. The present invention further permits powder coating of filament types which are difficult to spread. The following examples demonstrate these advantages.

EXAMPLE V

Coating of multiple ends of aramid fibers with nylon 11 powder. Twelve ends of Kevlar 49 aramid fibers of 2840 Denier were powder coated simultaneously with nylon 11 powder. In this example, powder coating was carried out in a horizontal configuration. The length of the oven used for fusing the powder to the tows was 2.44 meters. All the tows were run at 13.7 meters/minute. The temperature in the oven was not measured but controlled only as the fraction of power input to the heating elements. The tows were passed around fixed steel rollers before they entered the powder booth. The action of the tows around the steel rollers flattened the tows to a width of about 4 to 5 mm. The powder pickup was about 32%. The tows were then woven into a fabric (2 by 2 twill with 3.8 by 3.8 picks per centimeter) and the fabrics were consolidated into laminates. These laminates were tested in a 3-point bending configuration. The ultimate breaking strength was 0.3 GPa. The laminates were substantially void free (less than 2% voids) when the cross-sections were examined under the microscope.

EXAMPLE VI

Coating of multiple ends of E-Glass with polyester powder. Forty-eight ends E-Glass of 1600 yield were powder coated simultaneously with polyester (polyethylene terephthalate) powder. The powder coating system used is similar to the one used in the experiment discussed in Example V. In this case, 8 of the tows were combined into one tow before going into the powder chamber. This combined tow was passed around a fixed steel bar. The action of the tow around the steel bar flattened the combined tow to a width of about 20 mm. The processing parameters were kept at the same level as in the experiment of Example V. The amount of powder pickup in this case was about 36%. These towpregs were consolidated into unidirectional laminates and tested in a three point bending configuration. The ultimate breaking strength in the axial direction was 1.5 GPa and 0.07 GPa in the transverse direction. The laminates were substantially void free (less than 2% voids) when the cross-sections were examined under the microscope.

These examples clearly demonstrate that, with the present invention, powder coating of tows in flat ribbon form results in better towpreg properties. However, for textile preforming processes such as braiding, a circular or elliptical cross-sectional shape is often preferred to that of flat ribbon shape. In order to obtain a cross section closer to the circular or elliptical cross-sectional shapes, serving and heat shrinking operations are carried out in-line with the powder coating.

Figure 6:
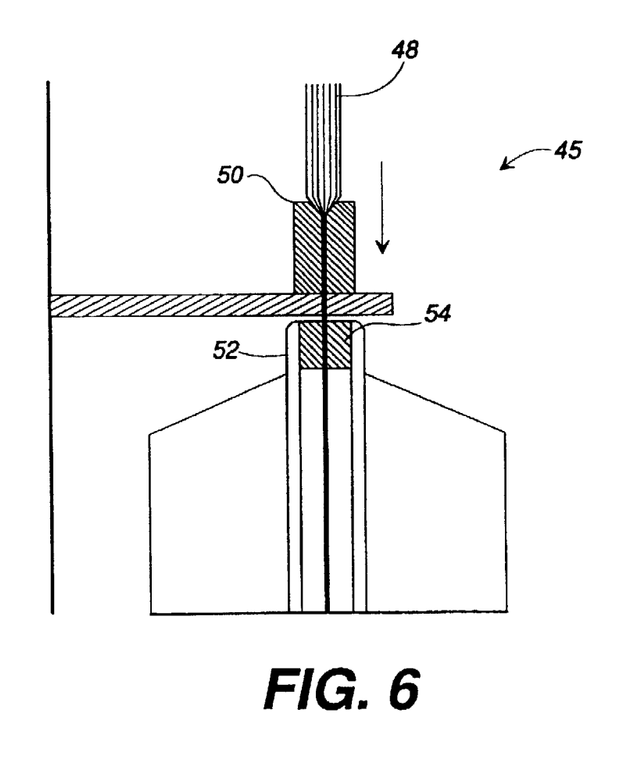
FIG. 6 illustrates a system for accomplishing serving operations in accordance with the present invention.

FIG. 6 illustrates a schematic diagram of a system 45 used for the serving operation. In this operation, the flat ribbon towpreg 48 is passed through a 3.2 mm (0.125") diameter hole in a TEFLON (PTFE manufactured by E. I. du Pont de Nemours & Co.) plug 50 and through the central hole in a hollow spindle 52, as shown in FIG. 6. The hollow spindle also is fitted with a similar Teflon plug 54 at the top. As the towpreg 48 is passing through the holes in the Teflon plugs 50 and 54, it is folded as a result of the diameter of the hole (3.2 mm) being smaller than the width of the towpreg (6.4 mm). The towpreg 48 then is wrapped with fine filament yarn (preferably but not necessarily made of the same material as the matrix material; other thermoplastic materials can be used) in its folded form by the rotation of the hollow spindle 52. The wrap density (number of wraps per unit length of the towpreg) can be changed by changing the speed of the hollow spindle 52 or by changing the line speed of the tow. A typical range of wrap density is 40 to 200 wraps per meter. Alternatively, a tow bundle having a circular cross-section may be wrapped with the filament yarn.

Figure 7:
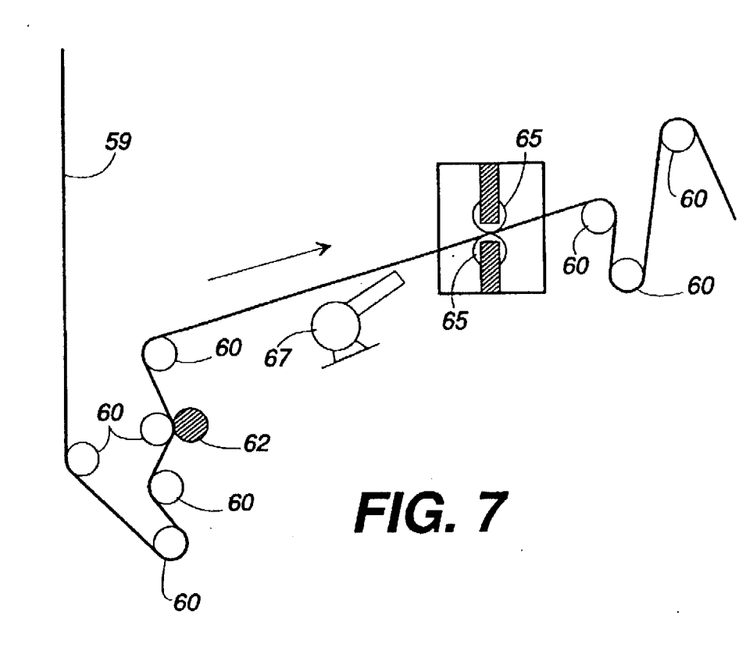
FIG. 7 illustrates a system for heating a towpreg wrapped with filament yarn to cause the yarn to shrink and wrap around the towpreg tightly.

Because the form of towpreg produced in accordance with this embodiment of the present invention has a smooth surface, the serving yarn is not held firmly to the towpreg surface. This makes it easier for the serving yarns to slide during further processing. In order to avoid this problem, the towpreg 59 is passed along guide rollers, which may include one or more idle rollers 60 and one or more drive rollers 62, and between heated rollers 65, which are heated by an air gun 67, as shown in FIG. 7. This causes the fine serving yarn to shrink and wrap around the tows or towpreg tightly. Alternatively, glass fiber can be used as the wrapping yarn. Although glass has a minimal shrinkage upon heating, the act of wrapping will hold the tows or towpreg together.

Figure 8:
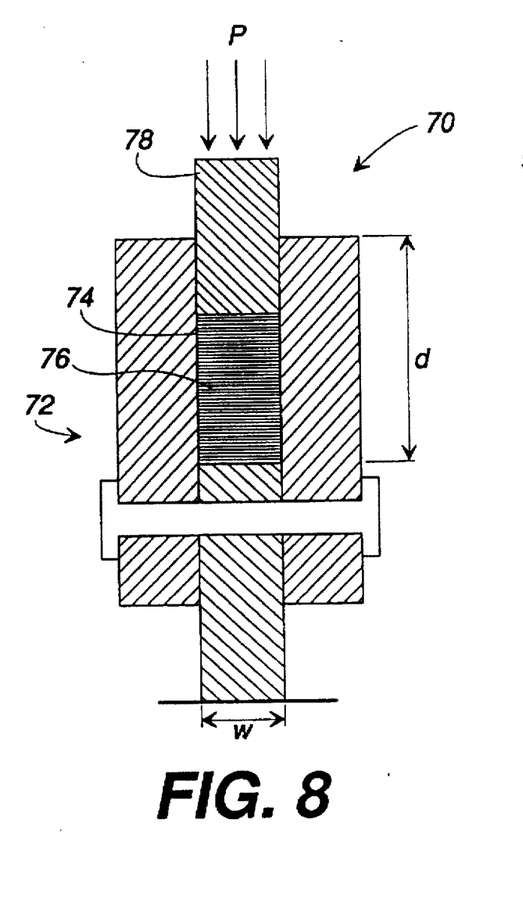
FIG. 8 illustrates a schematic diagram of a device used to measure the bulk of towpreg produced in accordance with the present invention.

FIG. 8 illustrates a schematic diagram of a device 70 used for measuring the bulk of towpreg produced in accordance with the present invention. The bulk factor, $B_f$, is defined as the ratio of the thickness ($t_p$) of the preform or towpreg to that of the fully consolidated thickness of the laminate ($t_c$) that can be made from this preform or towpreg assuming that there are no voids present in the laminate.

Bulk factor, $B_f = t_p/t_c$

An Instron model 1125, shown in FIG. 8 and indicated generally by numeral 70, is used for measuring $t_p$. A fixture 22 with a cavity 74 of dimensions 6.4 mm width and 254.0 mm length and 76.2 mm depth is fabricated to compress the towpregs 76 within an enclosed space, as shown in FIG. 8. Towpregs 76 are cut to lengths of 254.0 mm and 50 pieces of towpreg 76 are stacked inside the cavity 74. To measure the bulk factor of the towpregs, a pressure of 50.1 Pa is applied to the towpregs. This pressure level is chosen so that the measurements are comparable to other reported measurements. The displacement values of the towpregs are measured using a Linear Variable Differential Transformer (LVDT, not shown). The thickness of the towpregs is measured by taking the difference in the LVDT readings with and without the towpreg specimen in the fixture.

The bulk factor of nylon 6/12K G30-500 powder coated tow with 35% resin by weight, using the known spreading method, is 7.5. Similar towpreg produced in accordance with the present invention in the flat ribbon form with 12K T-700 carbon fiber/nylon 6 generally is less than 5.0, and has been produced as low as 2.6. Nylon 6/2840 denier KEVLAR 49 (poly-1, 4-p-phenylene Terephthalamide manufactured by E. I. du Pont de Nemours & Co.) powder coated tow has a bulk factor of 2.4. These measurements indicate clearly the relatively low bulk of the towpregs produced in accordance with the method of the present invention.

In summary, the present invention involves a novel method for producing flexible towpregs having low bulk. This is achieved by powder coating without spreading the tows. The basic processing steps involved are powder coating the tows and post treatment of the towpregs for further textile processing. Sizing the tow prior to powder coating can be undertaken if necessary. Accordingly, the towpregs produced by this novel method have a demonstrated lower bulk, low bending rigidity and improved processibility.

Prior to powder coating unspread fiber tows with the matrix resin, the tows are arranged in a predetermined cross-sectional shape, such as a flat ribbon form. The reshaping of the cross-section of the tow may be obtained by different means such as roller flattening or passing through shaped apertures. The sizing agent can hold the fibers together in the required shape. During the powder coating process, since the fibers are not spread, the powder particles do not enter into the fiber bundle, but rather coat only the surface of the tows. This results in dry fibers in the core of the towpreg and a sheath of fibers which are mostly wet out on the surface of the towpreg surrounding the core of dry fibers. The resin layer on the surface of the towpreg is formed by a partial melting of the powder particles. Partially melting the particles results in a resin layer which does not completely cover the surface of the towpreg. This type of sheath-core structure results in a towpreg with relatively low bulk and comparable flexibility in comparison to towpregs produced with the existing powder coating method. The discontinuous surface layer is beneficial in two ways: (1) it keeps the tow flexible as it provides freedom for the fibers to move relative to each other; and (2) it helps the air in the core of the towpreg to escape while consolidating these towpregs into composite parts, leading to substantially void-free parts.

One aspect of the present invention is the post treatment of flat ribbon towpreg produced in accordance with the present invention to convert the towpreg into flexible unidirectional tape. Two features of the flat ribbon towpreg make it amenable to conversion into flexible unidirectional tape. First, the towpreg is in a flat ribbon shape with consistent dimensions and with all of the fibers laid parallel to each other. Second, only the surface of the towpreg has been coated with the resin material. Converting the new towpregs into unidirectional tape involves the following process steps:

1. Placing the required number of spools of towpreg in a creel in a suitable manner;

2. Condensing the towpreg from the creel by any known means and preferably by a condenser board; the number of towpregs brought together to form a unit length across the width of the tape determines the aerial density (weight per unit area) of the tape; this step may involve overlapping of the towpregs;

3. Heating the sheet of individual towpregs formed in accordance with steps 1 and 2 such that the resin material melts; as the resin material is present only on the surface of the towpreg, the resin material can be melted with less energy than that which would be required if the resin material totally coated the fibers of the towpreg;

4. Applying pressure on the surface of the sheet of towpreg having the molten resin material thereon, such as by passing the sheet of towpregs between a pair of hot nip rollers, which makes the molten resin from neighboring towpregs mix; and 5. Cooling the sheet, resulting in unidirectional tape having a smooth, thin layer of resin on both the surfaces and dry fibers in the core; the resulting structure providing flexible unidirectional tape.

EXAMPLE VII

Flexible unidirectional tape. G30-500 (Toho Industries, Japan) carbon fiber tow with 12,000 filaments was converted into flat ribbon form using a nylon sizing agent and coated with nylon 6 resin powder. The amount of resin added to the carbon fiber was 35%±3% by weight. The towpregs were condensed into sheet form of 187 tows per meter. The resulting configuration was a unidirectional tape having a density of 244 g/m².

Tapes produced by this method form kinks when bent around high curvatures. This kinking phenomenon is a result of the towpregs being held together by resin material thereby allowing less freedom between the towpregs or fibers on a macro scale to reposition themselves when the tape is bent. Many composite applications require relatively high curvatures and therefore unidirectional tapes which do not kink when they are bent are needed. Accordingly, the present invention provides an ultraflexible unidirectional tape which does not kink when bent around relatively high curvatures.

Figure 9:
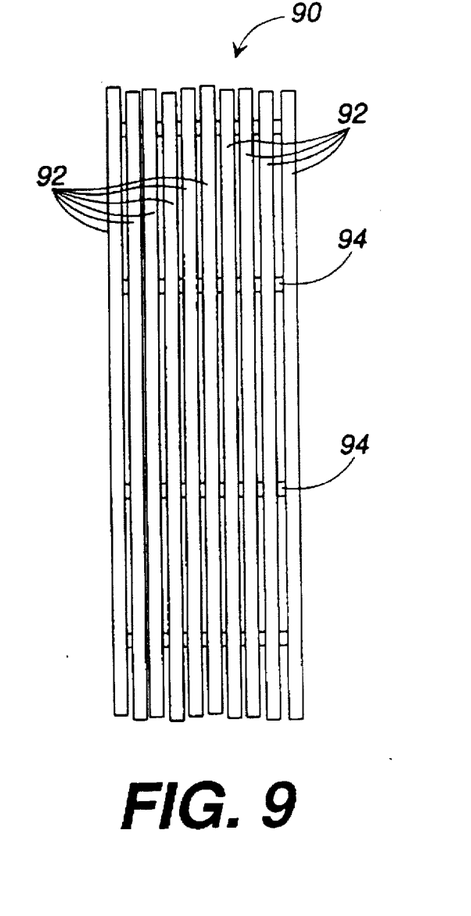
FIG. 9 illustrates a schematic diagram of the ultraflexible unidirectional tape produced in accordance with the post treatment process of the present invention.

To produce the ultraflexible unidirectional tape, the towpregs first are placed adjacent to each other using an appropriate creeling method. The resin then is melted and fused between the towpregs only in selected places. In this way, fibers or towpregs between the weld points have the freedom to reposition themselves when the towpregs are bent. FIG. 9 illustrates a schematic diagram of the ultraflexible unidirectional tape 90 formed in accordance with this embodiment of the present invention. The selective melting of the resin and selective fusing of the towpregs into a sheet can be accomplished in either of the two following manners:

1. One or a set of reciprocating or rotating hot rods or shoes may come down onto a slow moving sheet of towpregs and press the towpregs 92 against a hot metal surface thereby causing the resin to melt and form bridges or weld lines 94 between the towpregs; the distance between the weld lines can be changed by changing the frequency of the reciprocating movement or the rotational speed of the hot rods or shoes or by changing the speed of the sheet of towpregs; or
2. Heated rods with helical grooves can be used to apply pressure to press the towpregs 92 against a hot metal surface; in this case the weld lines 94 will be formed at an angle to the towpregs.

The selective melting and fusing also may be accomplished by other methods such as by using hot serrated rollers to form the weld lines or by point bonding of the sheet of towpregs by using a hot plate with the required pattern.

EXAMPLE VIII

Ultraflexible unidirectional tapes which avoid kinking when bent around is relatively high curvatures. G30-500 (Toho Industries, Japan) carbon fiber tow with 12,000 filaments was converted into flat ribbon form using a nylon sizing agent and a nylon 6 resin powder coating. The amount of resin material added to the carbon fiber was 35±3%. The resulting towpregs were condensed into sheet form with 157 tows per meter. The aerial density of the resulting tape was limited by the width of the individual towpregs. The resulting configuration was unidirectional tape having a density of 195 g/m².

The differences in flexibility of the unidirectional tape produced by the first embodiment (unidirectional tape of Example VII having a density of 244 g/m²) and the ultraflexible unidirectional tape produced in accordance with the second embodiment (unidirectional tape of Example VIII having a density of 195 g/m²) was measured using a cantilever beam principle (ASTM 1388). The deflection of the tape ($\delta_n$) for an overhang length (L) is measured by letting the tape (cut to a predetermined width) overhang. The bending rigidity (EI) was calculated by using the following equation:

$$EI = qL^4/8\delta_n$$

Where q is the weight of the tape per unit length. The bending rigidity of the unidirectional tape was calculated to be $207 \times 10^{-6}$ Nm² and that of the ultraflexible unidirectional tape was $264 \times 10^{-8}$ Nm². Therefore, the bending rigidity calculations clearly show that the ultraflexible unidirectional tape is significantly more flexible than the unidirectional tape produced in accordance with the first embodiment.

EXAMPLE IX

The unidirectional tapes produced in accordance with the first and second embodiments may both be used to make a tubular product with a 5° bend. The outside diameter of the tube is 22.2 mm and the inside diameter of the tube is 15.9 mm. These unidirectional tapes are oriented such that the fiber direction is along the tube on top of a braid. When comparing the unidirectional tape produced in accordance with the first embodiment to the ultraflexible unidirectional tapes produced in accordance with the second embodiment, the ultraflexible unidirectional tape did not form serious kinks in the finished composite part.

Although the present invention has been described with reference to particular embodiments, it will be apparent to those skilled in the art that modifications to the method, materials, dimensions and conditions discussed above may be made which are in keeping with the spirit and scope of the present invention.

What is claimed is:

1. A flexible towpreg consisting essentially of a bundle of fibers coated with a discontinuous sheath of a matrix resin thermally fused to the bundle, wherein said matrix resin thermally fuses in a discontinuous manner only to the fibers on the exterior of the bundle, while fibers in the interior of the bundle remain substantially free of the matrix resin.

2. The towpreg according to claim 1, wherein said discontinuous sheath does not completely cover the exterior surface of the towpreg.

3. The towpreg according to claim 1, wherein the fibers have a modulus of elasticity of at least 34 GPa.

4. The towpreg according to claim 1, wherein the fibers have a tensile strength of at least 0.70 GPa.

5. The towpreg according to claim 1, wherein the fibers of the tow are selected from the group consisting of carbon, organic, glass, metal and ceramic fibers.

6. The towpreg according to claim 1, wherein the towpreg has a bulk factor of less than 5.0.

7. The towpreg according to claim 6, wherein the towpreg has a bulk actor of between approximately 5.0 and approximately 2.0.

8. The towpreg according to claim 1, wherein the matrix resin is composed of thermoset resin powder particles.

9. The towpreg according to claim 8, wherein the resin powder particles are selected from the group consisting of epoxies, polyesters, acrylics, polyimides and phenolics.

10. The towpreg according to claim 1, wherein the matrix resin is composed of thermoplastic resin powder particles.

11. The towpreg according to claim 10, wherein the resin powder particles are selected from the group consisting of nylons, polypropylenes, polyesters, polycarbonates, acrylics, polyimides, polyetherimides, and polyaryl ethers.

12. The towpreg according to claim 1, further comprising a wrapping of filament yarn about the exterior.

13. The towpreg according to claim 12, wherein the towpreg has a circular cross-sectional form.

14. The towpreg according to claim 12, wherein said filament yarn is a material which shrinks upon the application of heat.

15. The towpreg according to claim 14, wherein said filament yarn is a thermoplastic material.

16. The towpreg according to claim 15, wherein the matrix resin is composed of resin powder particles composed of thermoplastic material, and the resin powder particles and said filament yarn are composed of the same thermoplastic material.

17. A flexible towpreg comprising a bundle of fibers coated with a discontinuous sheath of a matrix resin, wherein said matrix resin is thermally fused to the fibers on the exterior of the bundle while fibers in the interior of the bundle remain substantially free of the matrix resin, wherein the towpreg having a flat ribbon cross-sectional form is folded along its length to a reduced width with a filament yarn wrapped about the folded towpreg.

* * * * *